United States Patent [19]

Battigelli et al.

[11] Patent Number: 5,601,628
[45] Date of Patent: Feb. 11, 1997

[54] METHOD FOR THE PRODUCTION OF MINERAL WOOL

[75] Inventors: Jean Battigelli, Rantigny; Guy Berthier, Clermont, both of France; Hans Furtak, Speyer am Rhein, Germany; Daniel Sainte-Foi, Clermont, France

[73] Assignee: Isover Saint-Gobain, France

[21] Appl. No.: 211,171

[22] PCT Filed: Aug. 20, 1992

[86] PCT No.: PCT/EP92/01915

§ 371 Date: Aug. 20, 1994

§ 102(e) Date: Aug. 2, 1994

[87] PCT Pub. No.: WO94/04469

PCT Pub. Date: Mar. 3, 1994

[51] Int. Cl.⁶ .................................................. C03B 37/04
[52] U.S. Cl. ........................................... 65/461; 65/523
[58] Field of Search .................... 65/460, 461, 459, 65/522, 523, 521

[56] References Cited

U.S. PATENT DOCUMENTS

| | | | |
|---|---|---|---|
| 2,931,062 | 4/1960 | Leaman | 65/522 |
| 3,012,281 | 12/1961 | Stalego | 65/522 |
| 3,304,164 | 2/1967 | Charpentier | 65/522 |
| 3,785,791 | 1/1974 | Perry | 65/522 |
| 4,046,539 | 9/1977 | Pitt | 65/522 |
| 4,392,879 | 7/1983 | Takeuchi | 65/522 |

FOREIGN PATENT DOCUMENTS 1025215  4/1966  United Kingdom .................... 65/522

*Primary Examiner*—John Hoffmann
*Attorney, Agent, or Firm*—Sterne, Kessler, Goldstein & Fox P.L.L.C.

[57] ABSTRACT

Mineral material, particularly of the basalt type, is fiberized by internal centrifuging in a spinner having a peripheral wall with a plurality of orifices. A heated gas flow attenuates into fibers the filament cones emanating from the orifices. To produce mineral wool with good fiber fineness and largely free of unfiberized particles, the length of the filament cones and the configuration of the heated gas flows generated around the spinner are adjusted so that the majority of the filament cones emanating from the spinner orifices intersects the isotherm corresponding to a viscosity of 100 poises to enter into a zone cooled down to a temperature corresponding to a viscosity of more than 100 poises. The configuration of the heated gas flow is produced by an annular external burner in conjunction with an annular external blower that produces jets of cool air. The cool air brings low-temperature isotherms in close vicinity to the peripheral wall of the spinner. This enables the tips of the filament cones to reach into a cool zone, thereby increasing the viscosity at the tip of the filament cones to avoid breakage of the filament cones to be attenuated.

9 Claims, 4 Drawing Sheets

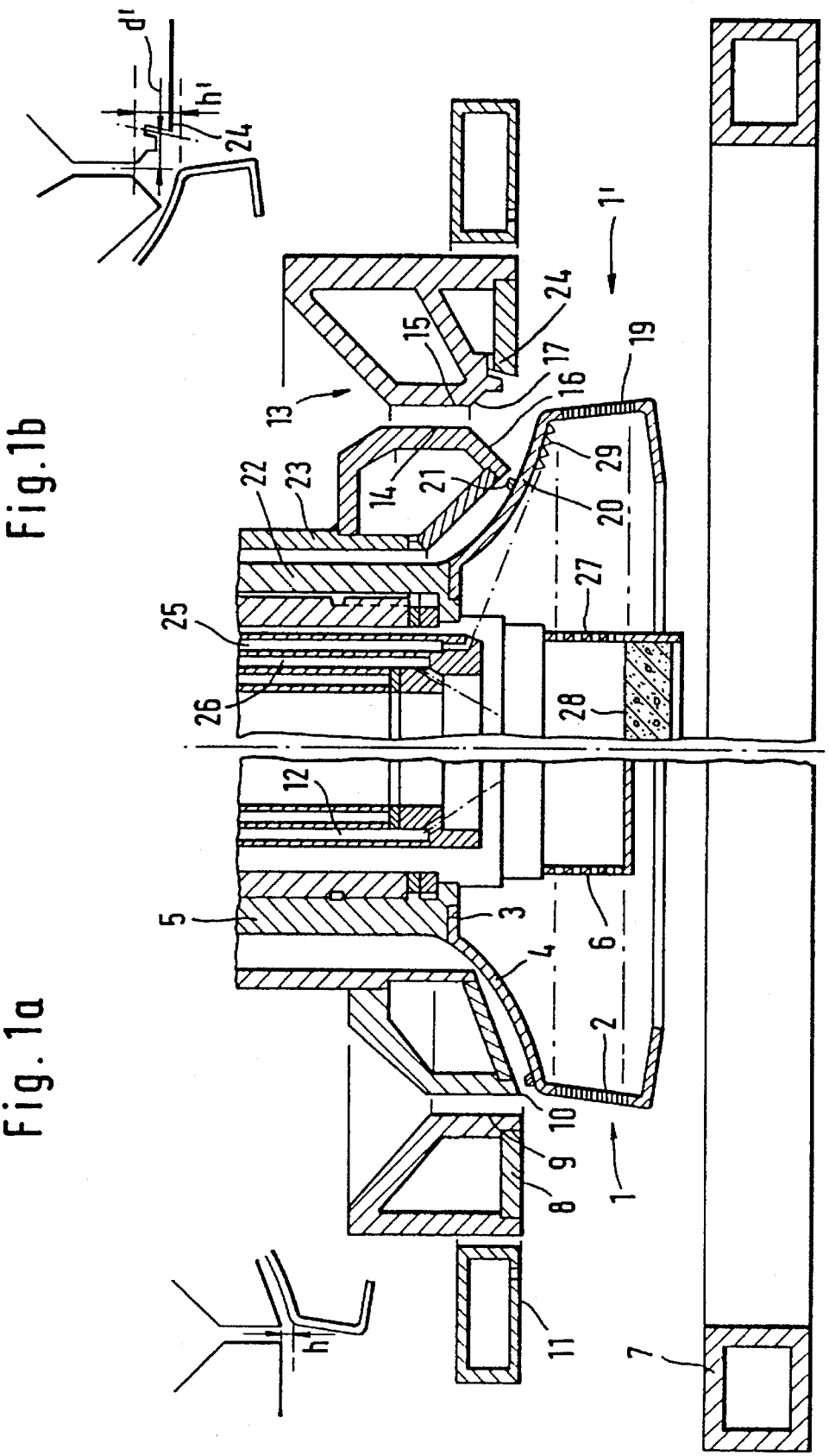

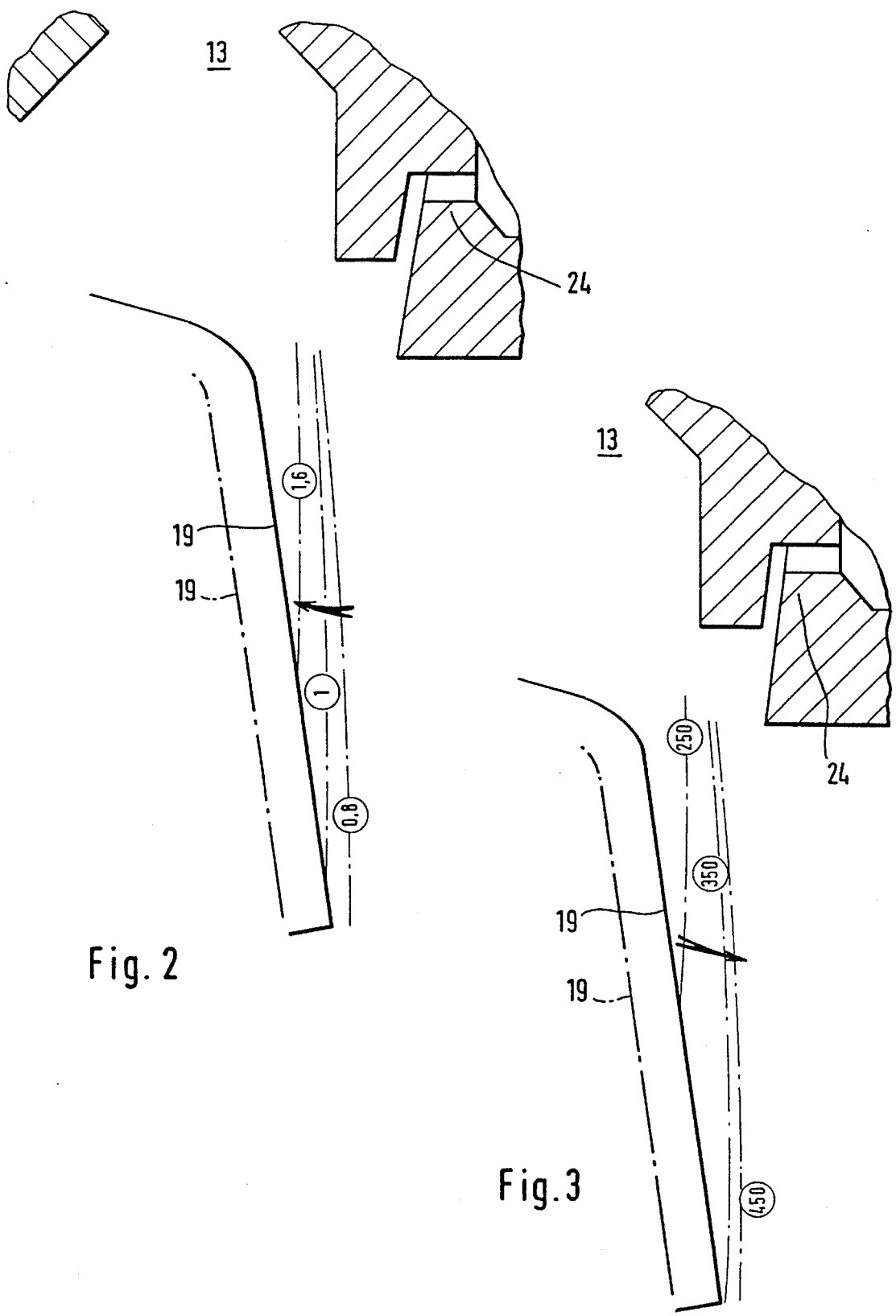

METHOD FOR THE PRODUCTION OF MINERAL WOOL

BACKGROUND OF THE INVENTION

1. Field of the Invention

The present invention concerns a method for producing mineral wool consisting of thermoplastic mineral materials with high melting points or high liquidus temperatures, and more precisely to such a method employing a fiberization process that comprises so-called internal centrifuging the molten mineral material. The thermoplastic materials in question are more precisely basaltic materials, either natural or modified basalts, or by-products of the iron and steel industry, in particular blast furnace slags (scoriae). In general, the invention applies to the production of mineral wool, so-called rock wool with a wide range of use, particularly in the field of thermal and acoustic insulation.

2. Description of Related Art

On the one hand, these materials are chosen for their low costs, and on the other hand for their properties, especially their good resistance against high temperatures. Their production, however, creates specific problems. These problems particularly stem from the conditions in which these materials are workable.

Their high melting temperatures present a difficulty in itself. The melting temperature is the temperature to which the raw materials have to be heated to guarantee melting. Furthermore, where production is concerned, it is the temperature above which the material must be kept such that it will not solidify before its transformation into fibers.

Another particularity discerning these materials from the glasses mostly used for glass wool production is that, as a rule, they are highly fluid at temperatures in close proximity of their liquidus temperatures.

Also due to the required high temperatures, the devices getting into contact with the materials to be fiberized are subject to very intensive corrosion. Operational lifetime of these devices presents a problem even with conventional glasses. The problem becomes even more critical with high liquidus materials.

In the past, the above-mentioned difficulties meant that only certain fiberizing techniques could be applied with the materials in question. There are essentially two kinds of techniques: those employing centrifuging or spinning off the molten mineral material, and those where the material is fed through a stationary nozzle and attenuated into fibers by gas flows often accelerated to supersonic speeds (blast drawing method).

For techniques applying a fixed nozzle, it is necessary to utilize a nozzle which is able to resist the attack of the molten mineral material. Traditionally, these are platinum nozzles able to withstand these attacks even at such high temperatures. Production capacity of each nozzle, however, is limited. In addition, the use of such attenuating gas flows generates comparatively high energy costs.

Techniques employing centrifuging or spinning off allow considerable production quantities per unit. Those are techniques summarized under the generic term "external centrifuging", in order to indicate that the molten mineral material remains outside the spinner. The molten mineral material is either applied to the front surface of a disk or to the peripheral surface of a cylindrical rotor, or a plurality thereof. An advantage of these techniques is the simplicity of the parts of the device entering into contact with the molten mineral material. With respect to this relative simplicity, the parts in question and in particular the spinner rims are relatively cheap and therefore can be exchanged within relatively short time spans. The proportion of such material costs of total production costs remains relatively low. The fact that these device parts are subject to intensive wear upon contact with the molten mineral material does therefore not turn out to be an obstacle.

The main disadvantage of mineral wool production by external centrifuging lies in the fact that the properties of the final product are inferior to those of glass wool which is mainly produced by so-called "internal centrifuging".

In external centrifuging, the material flows onto the spinning wheels and is flung off them as a multiplicity of droplets. The fiber apparently forms once it is flung off, between the surface of the spinner and the droplet drawing the fiber after it. It is obvious that with such a fiberizing mechanism, a considerable portion of the spun-off materials remains in the form of unfiberized particles. Their proportion for particle sizes in excess of 100 μm can be as high as 40 weight percent of the material charged into the process. Although several methods are available for separating the unfiberized particles, the finished mineral wool is never entirely free of such particles which at best are of no use, and very much of a nuisance for particular applications.

It should be pointed out that drop formation is not only a necessary result of external centrifuging, but depends also on the rheological characteristics of the materials in question. Materials processed according to the invention generally have comparatively low viscosities, even at temperatures only slightly above liquidus temperature. The molten mineral material, which is relatively fluid, is difficult to fiberize as the filaments have a tendency to break and to form drops or beads. In a way, the technique of external centrifuging relies on this tendency, however without eliminating its disadvantages.

SUMMARY OF THE INVENTION

One essential objective of the present invention is to provide a process for producing mineral wool from a material with elevated liquidus temperature and low viscosity, for example a viscosity below 5,000 poises at liquidus temperature, and mostly lower than 3,000 or even 1,000 poises at liquidus temperature, in such conditions that a mineral wool largely free of unfiberized particles may be obtained. The liquidus temperature is a value of the thermal equilibrium and corresponds to the lowest temperature at which crystals are not detected in the equilibrium. In order to determine this temperature, a sample of broken material is heated to the measurement temperature for a time span sufficient to produce a state of equilibrium (e.g., 16 hours under practical conditions). The sample is then taken from the oven and quenched to environment temperature, ground to form a thin chip and inspected under a microscope; the liquidus temperature then corresponds to the threshold temperature between the upper temperature range where no crystals can be found, and the lower range where the presence of crystals is noted. The term "liquidus temperature" by itself refers to the highest temperature at which the appearance of a first crystalline species is observed. More specific, the liquidus values can be measured for the appearance of each crystal species, or at least for predominant species at elevated temperatures that are relevant in the scope of the invention.

By way of the invention, it is shown that it is possible to produce mineral wool of such a material with an elevated liquidus temperature, in particular with a liquidus of above 1,200° C., by spinning the molten mineral material off a spinner with a large number of small-diameter orifices in its peripheral wall, with the spinner temperature during ongoing operation being kept below the temperature at which the material may clog the orifices due to crystallization, and with a gaseous environment being created around the spinner such that the majority of the tips of the cones emanating from the spinner orifices, whose lengths are capable of being varied independently from each other, intersect the isotherm of the gas flow corresponding to a viscosity of 100 poises or preferably 250 to 300 poises, or otherwise reach into a zone cooled down to a temperature corresponding to a viscosity of more than 100 poises or preferably 250 to 300 poises.

In order to fiberize a material, it is definitely necessary that it will not crystallize inside the spinner, and that it has a viscosity permitting attenuation into fibers. It is commonly known that above 80,000 poises, viscosity becomes a virtually insurmountable obstacle for attenuation of the fibers, at least under industrial conditions, but with the materials considered in the scope of the invention, this value of 80,000 poises cannot be made use of in practice as the material very suddenly passes from a much lower viscosity to an indefinite value of viscosity. In such cases, the upper limit for viscosity is the value corresponding to the lowest temperature at which the viscosity μ of the material still behaves according to the so-called Vogel-Fulcher-Tammann equation $$lg\, \mu = A + \frac{B}{T-C}$$

with T representing the temperature in °C. and with A, B and C representing constants typical for the material in question and being calculated in a manner known per se from three pairs of measurements of μ and T of this material. In most cases, this limit to be considered will actually be in the order of 3,500 or even 3,000 poises (i.e. a value of lg μ beween 3.47 and 3.54; for this reason, the temperature corresponding to lgμ=3.5 will be given in the following).

On the other hand, the material must not be too fluid at the moment of attenuation into fibers. Below a value of 100 poises (lgμ=2), and sometimes even experimentally below 200–320/350 poises (lgμ=2.3 to lgμ=2.5), the molten mineral material will form droplets which are present inside the product in the form of beads. In practical work with the present invention, bead rates lower than 10% (wt.) have been observed for viscosities in the order of 100 poises, and bead rates lower than 5% (wt.) for viscosities in excess of 320/350 poises. It must be pointed out that this limit of 100 poises is relatively high and characteristic for the invention; with external centrifuging, the material is worked at viscosities as low as several tens of poises and, as mentioned above, with very important amounts of beads formed.

The problem of the resolution of the material into droplets and the limit of 100/350 poises resulting therefrom does not only concern the moment in which the material passes through the orifices of the spinner, but is to be observed during the whole duration of the attenuation into fibers occurring outside of the spinner. From there it results that the spinner should not be placed into an environment too warm so as to unduly lower the viscosity of the material.

Here, four temperature zones through which the material passes may be considered:
  the temperature of the spinner wall which is the same as the temperature of the material inside the orifices;
  the temperature of the gases in a zone with a thickness of several millimeters in the immediate vicinity of the disk-shaped spinner, which shall be designated as the boundary layer around the spinner;
  the temperature of the gases in a zone extending radially from the free tip of the attenuation cones for several (5 to 10) millimeters, which shall be designated as the "cooling zone";
  the gas temperature in an intermediate zone between the two preceding ones, which shall be designated as the "attenuation zone".

According to the invention, the configuration of the gas flows generated around the spinner is such that within the attenuation zone, the ambient temperature and therefore the temperature of the material, corresponds to at least 100 poises and preferably at least 250 to 350 poises.

Such a temperature profile can, for example, be obtained by means of a hot, annular gaseous jet or blast which envelops the perforated spinner wall over its entire periphery and, in combination with the material contained therein, keeps it at a temperature sufficiently high to avoid devitrification, and furthermore by means of a preferably cold jet which intercepts the hot blast over its entire periphery and confines the action of the hot blast to the immediate environment of the perforated peripheral wall. The hot gaseous blast is generated by a concentric annular burner of the fiberizing unit, and the cold jet is emitted by a blower arranged concentrically to said burner as it will be described herebelow.

Due to the unprecise position of the borders of the attenuation zone as inherent consequence of the mixing of the blast and the jet with different temperatures, it is preferred to be able to separately influence the length of the attenuation cones independently of each other, in order that they, or at least a majority of them, may be situated inside said attenuation zone as defined by the gas jets over their entire length. According to the invention, these lengths of the cones are adjusted via the orifice diameter and/or the rotational velocity of the spinner.

The gas jet emitted by the blower is preferably cold, i.e. at a temperature close to the ambient temperature, or not in excess of 250° C., for example. Under these circumstances, the blower contributes to the creation of a "cold" environment still at a short distance around the spinner, i.e. still inside the zone of fiber attenuation. This arrangement has the advantage that it permits to improve the ratio of the viscous resistance against deformation and of the surface tension responsible for drop formation. The relation between these forces is a function of the non-dimensional figure $$\frac{\mu V}{\sigma}$$

where μ stands for the viscosity of the material at the moment of its projection from the orifice, V for its velocity, and σ for its surface tension. By increasing the product μV, thanks to the cold blower which influences the viscosity and also the velocity by the velocity of the emitted cold jet, the tendency to form drops and the resulting beads is reduced.

In order to maintain the equilibrium value of the spinner at a value sufficient to avoid devitrification, it is necessary to heat it even though the molten mineral material already constitutes a very considerable heat source. For this purpose, various heating devices are preferably used in combination.

Outside the spinner, this is in particular an annular burner like (the one) mentioned before, preferably with internal combustion and producing an annular gas flow with an elevated temperature in the vicinity of the upper side of the spinner peripheral wall. Preferably, the hot gas flow is not only directed in such a way as to pass along the peripheral wall of the spinner, but such that it also envelopes part of the connecting band or "tulip" connecting the peripheral wall with the flange which is used to fasten the spinner to its support shaft (in the case of a bottomless spinner), or with the upper reinforcing collar (in the case of a spinner driven via its bottom wall), such that these parts are heated, too.

For this purpose, supplementary burners may be used whose flames are directed at the "tulip". Another solution is to arrange the external burner at a greater distance from the upper side of the peripheral wall, such that the gas flow is already somewhat dilated before approaching the spinner and reaching a relevant part of the "tulip". Here, however, the distance should be kept so small that good precision of the impinging flow can be maintained. According to a third variant of the invention, an annular external burner may be used, the inner channel wall of which has a lesser diameter than the outer diameter of the spinner. In this case, for example, a burner with prolonged oblique discharge lips for delimiting a flaring jet of hot gases may be provided.

Again on the outer side of the spinner, preferably induction heaters are provided with an annular magnet for the passage of an electrical current with a high, or preferably a medium high, frequency. As known per se, the annular magnet may be arranged immediately below the spinner and concentrically to it. The combination of these two heating devices essentially contributes to a thermal balance of the spinner, and it must be kept in mind that efficiency of these heating devices is better the more closely they are arranged near the spinner, and that in this way, the external burner predominantly heats the upper part of the centrifuge or spinner, whereas the annular magnet in its turn predominantly heats the bottom part of the spinner. As it was found that it is very difficult to heat the upper side of the peripheral wall without heating all the other nearby metal parts which in particular are enveloped by the hot gas flow, the described dual heating system avoids technological problems.

One further essential difference between these heating devices is their effect on the gas temperature in the vicinity of the spinner. The induction heater does not have a practical effect in this respect and therefore does not contribute to environmental heating apart from heating by radiation. The annular external burner, on the other hand, inevitably must heat the environment to a considerable degree, although the secondary air sucked by the rotational movement of the spinner and the high speed of the annular gas flow in turn suppresses introduction of heat into the environment. For optimum fiber quality, in particular under the aspect of the mechanical resistance, it is however not advantageous if the fibers are exposed to an excessively hot environment immediately after emanation from the spinner. Under these aspects, the temperature of the gas exhausted from the annular external burner is preferably limited.

The blower has furthermore a distinct effect on fiber attenuation. With identical operating conditions of the external burner, increased blower pressure thus allows to increase fiber fineness. From another point of view, the blower allows to reduce the blast pressure of the external burner and thereby save energy at equal fineness. For instance, good results have been achieved with plenum pressures of the blower between 0.5 and 4 bar and preferably between 1 and 2 bar.

Even in view of such improvement, the external heating devices may not be enough to maintain the thermal equilibrium of the spinner. This deficiency must be remedied by additional heating devices arranged inside the spinner. This supplementary introduction of heat is preferably achieved by means of a diverging internal burner arranged concentrically to the support shaft of the spinner, the flames of which are directed at the inside of the peripheral wall. Preferably, the fuel/air ratio is adjusted such that the flame root is positioned in the immediate vicinity of the inner wall.- A certain number of protrusions serving as flame retention means are furthermore advantageously provided at the inner wall of the "tulip". The diverging internal burner contributes preferably between 3 and 15% of the thermal input in ongoing, continuous operation—as far as it is not derived from the molten mineral material. This appears to be a contribution of only minor significance, but this heat input occurs with extraordinary precision, is arranged precisely at the required place, and is therefore extraordinarily efficient.

The diverging internal burner utilized during fiberization advantageously complements a central internal burner known from prior art where, however, it is exclusively employed during the start-up phase and in principle intended to heat the bottom wall of the spinner—or of the distributing means serving as a bottom wall and usually referred to as a cup, or, more generally, the central area of the spinner. The central internal burner pre-heats the cup or the bottom wall before feeding of the molten mineral material occurs. According to the invention, the central burner preferably is an annular burner with a converging flame, arranged between the spinner support shaft and the diverging central internal burner.

During the start-up phase, it is understood that the external heating facilities are also used. If necessary, even flame lances or similar devices may be utilized as supplementary heaters. The diverging internal burner is, of course, also used during the critical start-up phase while the thermal input of the molten mineral material is not yet available.

Materials which are usable according to the invention are in particular natural basalts, but also similar compositions such as those obtained either by adding composites to a basalt with the purpose of influencing certain ones of its properties, or by the combination of materials, thus making it possible to reproduce the chief characteristics of basalts, particularly their temperature behavior and, especially, the fact that melting is achieved at temperatures generally not below 1,200° C. These are also mineral compositions, such as blast furnace slags or all those compositions used for the production of so-called rock wool. The materials in question also include compositions qualifying for the term "vitreous". These latter ones are called "hard glasses" in order to illustrate the difficulty created by their melting temperatures.

BRIEF DESCRIPTION OF THE DRAWINGS

Further advantageous details and features of the invention will be apparent from the following description in conjunction with the drawings.

FIG. 1 is a schematized view comparing a centrifuging device known from prior art (longitudinal section 1a) with one according to the invention (longitudinal section 1b);

FIG. 2 is a schematized diagrammatic view of the isotherms showing the action of a blower according to the invention.

FIG. 3 is a schematized view of the isotherms showing the action of the annular external burner.

Figure 4:
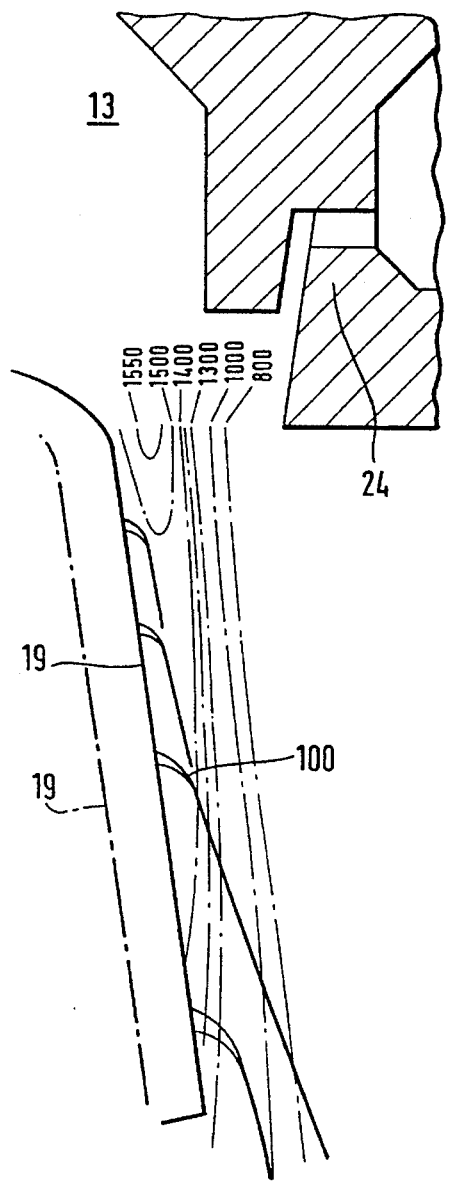
FIGS. 4 to 7 are schematized views of the isotherms and the fiberization cones showing the process of fiber formation.
Figure 5:
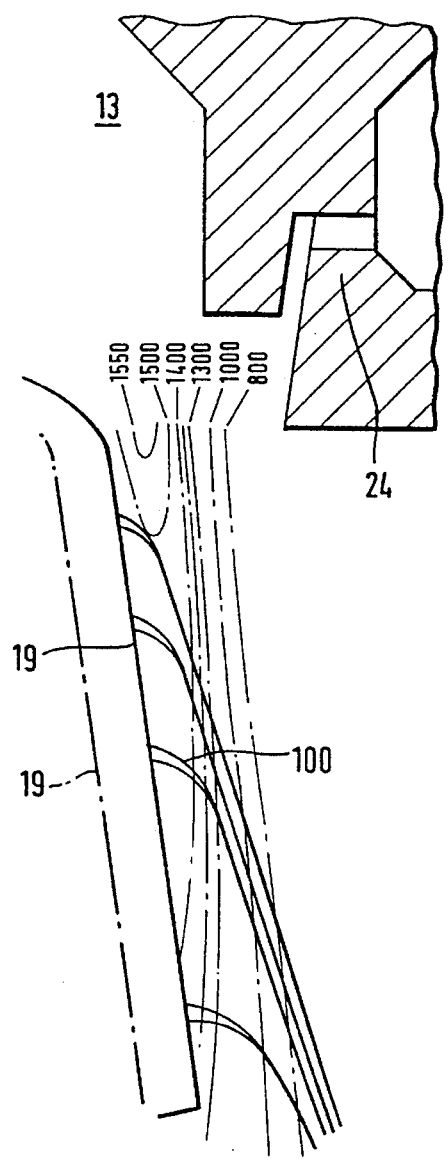

The invention is illustrated by means of FIGS. 1a and 1b which show fiberizing units according to prior art and the invention, respectively.

DESCRIPTION OF THE PREFERRED EMBODIMENTS

The fiberizing unit has been developed from an apparatus previously used for production of glass wool by internal centrifuging which has been the object of detailed descriptions namely in the patent specifications FR-B1-2443436 and EP-B1-91381. This conventional device, shown in a simplified manner in FIG. 1a, consists chiefly of a spinner 1 the peripheral wall 2 of which has a multiplicity of discharge orifices. The peripheral wall 2 is connected to a flange 3 via a connecting band 4, referred to as a "tulip" because of its shape. As illustrated by the drawing, peripheral wall 2, tulip 4 and flange 3 are formed as a whole in one single, unitary piece.

Flange 3 is mounted on a supporting shaft 5 which is hollow in the shown embodiment, and through this cavity the molten mineral material is supplied.

The supporting shaft 5—or even the flange 3—furthermore supports a concentric distributing means 6, usually referred to as a "cup" or "basket". The distributing cup with a peripheral wall which has a relatively low number of orifices with comparatively large diameters, serves as the bottom wall of the spinner and distributes the stream of molten mineral material by separating it into a plurality of streamlets which are spread over the inner circumference of peripheral wall 2.

The spinner 1 is surrounded by diverse heating devices: an annular magnet 7 which particularly heats the bottom portion of the spinner 1, above all in order to compensate cooling upon contact of environmental air which is strongly cooled by the considerable quantities of air sucked by the revolution of the spinner 1 and by a water cooled annular external burner 8. The ends of channel walls 9 and 10 of the external burner 8 are arranged at a slight distance h from the spinner 1, for instance in the order of 5 mm, as shown by the sketch at the top left side of FIG. 1a.

The annular external burner 8 generates a high temperature and high velocity gas flow substantively directed in a vertical direction and thus passing along peripheral wall 2. The gas flow on one hand serves to heat, or maintain the temperature of peripheral wall 2, and on the other hand contributes to attenuating the filaments of spun-off molten mineral into fibers.

As represented in the drawing, the external burner 8 is preferably surrounded by a blower ring 11 for cold air, the main objective of which is to limit radial expansion of the hot gas flow and thereby keep the formed fibers from getting into contact with the annular magnet 7.

These external heaters of spinner 1 are complemented in its inside by an internal annular burner 12 which is positioned inside the supporting shaft 5 and utilized merely during the start-up phase of the fiberization unit for preheating the cup 6.

As illustrated by FIG. 1b, a device according to the invention consists of the same components, and only the differences shall be discussed in the following.

The most striking difference concerns the position of the external burner shown at 13, with channel walls 14 and 15, the ends of which are positioned at a distance d' above peripheral wall 19 of spinner 1 as more particularly shown in the detail at the top right side of FIG. 1b. For example, a distance h' in the range of 15 to 30 mm and preferably in the range of 20 to 25 mm is much better suited as such a distance still permits a high flow accuracy of the gas flow. Furthermore, the inner channel wall 14 has a diameter which is distinctly smaller than the diameter of the top side of peripheral wall 19. In order to guide the gas flow upon emission, the external burner 13 is limited by two oblique surfaces 16 and 17 at right angles to each other. In order to limit the problems with radial expansion of the hot gas from external burner 13, the outer oblique surface 17 is only about half as long as its counterpart 16 and ends in an essentially vertical wall 18. The walls 16 and 18 end at a height in the vicinity of the height of the emission channel walls of a conventional external burner.

With such an arrangement of external burner 13, not only the peripheral wall 19 of the spinner 1', but also the tulip, now shown at 20, is being heated. The gas flow, however, should not rise along the tulip and heat the supporting shaft. In order to avoid this, an annular protrusion 21 or an equivalent means serving as a sealing element, such as a revolving seal, can be provided here to be arranged, for instance, at half the height of the tulip, with this position determining the length of the tulip 20 heated by the annular gas flow.

In addition, a blower 24 has been added to the external burner 13. The distance d' (measured by comparison with the central emission axes of the external burner and of the blower as shown in the detail drawing) is very small and for example in the order of 10 to 15 mm. The purpose of this blower is shown in more detail by FIG. 2. This figure actually shows the external spinner wall 19 in a simplified form, the external burner 13 in a form modified according to the invention, and the blower 24. The isotherms for 1,300° C. and for three blower plenum pressure values (0.3–1 and 1.6 bar) for the same dynamic pressure of the burner of 350 mm $H_2O$ have been plotted in the vicinity of the peripheral wall. Increasing the blower pressure causes the isotherms to move closer towards the spinner wall 19.

On the other hand, increasing the burner pressure causes all the isotherms of the spinner peripheral wall to shift very clearly as shown in FIG. 3, where the burner pressure has been modified from 250, 350 to 450 mm $H_2O$ for a blower plenum pressure of 0.3 bar.

In FIGS. 2 and 3, it can furthermore be seen that the blower emits jets which are not perfectly vertical but slightly inclined towards the bottom of the spinner. The main consequence is that the effect of the annular external burner is concentrated on the upper side of the peripheral wall, while the cooling effect on the lower side of the wall is weak. This cooling effect, however, can easily be compensated by heating with the annular magnet.

Apart from confining the gases emitted by the annular external burner, the blower has a direct effect on the attenuation of the filaments projected by the spinner. Fiber fineness can be maintained by reducing the blast pressure of the hot gases and by compensating this reduction with increased pressure of the cold blower gases. As regards the bead content, a considerable reduction can be seen when the pressure of the blower is raised.

Another comparison between FIGS. 1a and 1b shows one more essential difference in that a second internal burner 25 has been provided which is positioned concentrically around the central inner annular burner, now shown at 26 and, as usually, serving to heat the cup, now shown at 27. The internal burner 25 is an annular burner with diverging flames which are directed at the inner surfaces of the peripheral wall 19 and of the tulip 20. The arrangement of flames is preferably optimized by protrusions 27 on the inside of tulip 20 which serve as flame retention means.

On the other hand, the cup 27 has a relatively thick bottom wall 28 which for instance is formed of a ceramic plate or heat resistant concrete in order to avoid rapid erosion by the molten mineral material. In addition, this thick bottom wall serves as a heat insulation and thereby prevents cooling of the inside of the bottom wall due to gas or air flow induced underneath the spinner by its rotation.

Experiments were conducted with a material to be fiberized corresponding to the following composition (in weight percent):

| | |
|---|---|
| $SiO_2$ | 51.5% |
| $Fe_2O_3$ | 10.1% |
| $Al_2O_3$ | 18% |
| MnO | 0.19% |
| CaO | 8.9% |
| MgO | 6.4% |
| $Na_2O$ | 3.5% |
| $K_2O$ | 0.61% |
| $TiO_2$ | 0.66% |
| $P_2O_5$ | 0.12% |

This composition behaves according to the following law of Vogel-Fulcher-Tammann:

$$lg\ \mu = -2.542 + \frac{4769.86}{T - 355.71}$$

The characteristics of the apparatus and the operational conditions are summarized in the table at the end of this description.

It must be kept in mind that the measured values correspond to values at equilibrium, measured after at least 15 minutes of feeding the material, with spinner and cup pre-heated by means of all of the available heating devices (with the exception of the diverging internal burner in the first test).

The spinners used for these tests are made of a nickel-based ODS alloy of the austenitic type with 30% chromium, a melting temperature of 1,380° C., a tearing resistance of 130 MPa at 1,150° C., a creep resistance equalling 70 or 55 MPa after 1,000 hours at 1,150° C. and 1,250° C., respectively, and a ductility of 5% at 1,250° C.

In the table, the plenum pressure of the external burner 13 is given in millimeters $H_2O$. The flow rates of the burners (IB standing for internal burner) are in standardized cubic meters per hour.

As regards the quality of the produced fibers, the value of F 5g corresponds to the Micronaire. The Micronaire is a standard method for characterizing the fineness of fibers. For instance, so-called light insulating products of glass wool for which the main criterion is thermal resistance (rolled products with a density lower than 40 kg/m$^3$), are often based on fibers with a Micronaire 3 whereas heavier products for which a considerable mechanical resistance is desired are based on fibers with a Micronaire 4.

The best results were achieved with a spinner temperature in the vicinity of 1,260°–1,270° C. (for this composition, the viscosity lies between 350 and 1,000 poises between 1,300° C. and 1,216° C.); this is consequently well inside the range of fiberization.

It was also possible to establish that the best results are achieved by balancing the different sources of heat input, in particular by proceeding with a relatively large gas flow rate for the internal burner (but anyway at hardly the tenth part of the flow rate for the external burner) and a power supplied to the annular magnet which was similarly large, and a rather high pressure for the blower.

In order to better understand the phenomenon of bead formation, various modifications of glass temperature and blower plenum pressure were carried out independently of each other, and the isotherms of the gas flows and the fiber formation cones of each configuration were plotted for a number of exemplary rows of orifices.

The table hereafter gives the experimental conditions and the characteristics of the obtained fibers.

Figure 6:
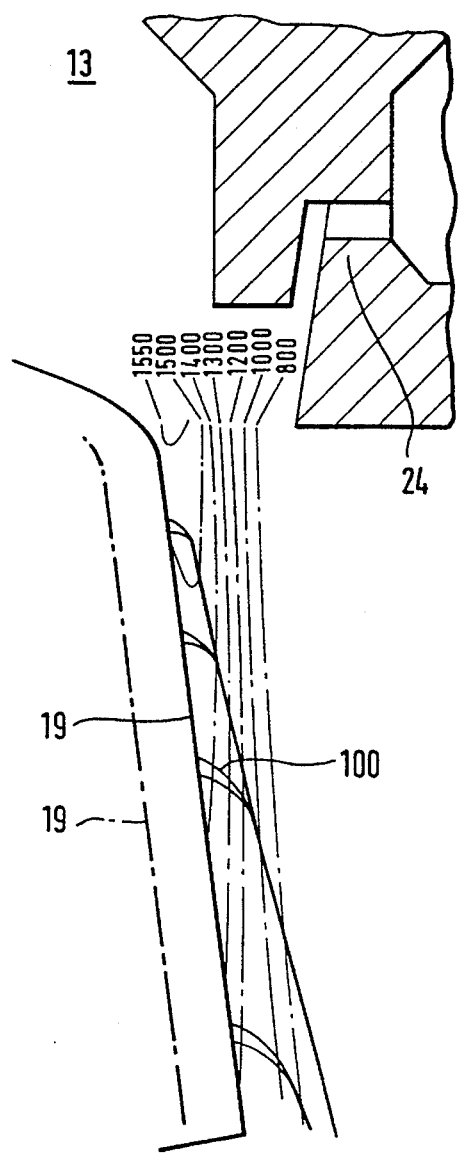
Figure 7:
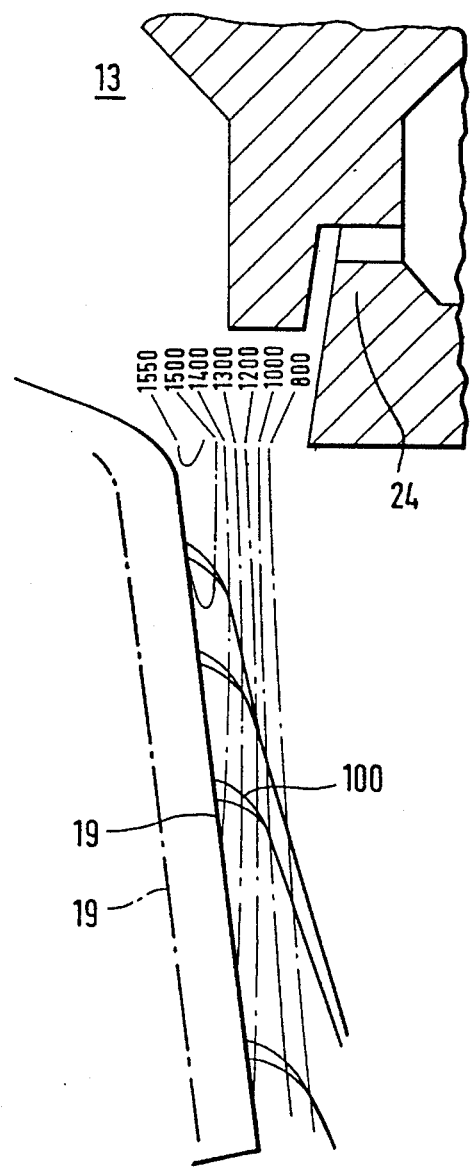

FIGS. 4 to 7 show the configuration of the fiberization cones and the positions of the isotherms for 800°–1,000°–1,300°–1,400°–1,500° and 1,550° C. at blower plenum pressures of 0.3 (FIGS. 4 and 5) and 1.6 bar (FIGS. 6 and 7), and two temperatures of the "melt" stream, one configuration corresponding to "cold melt" (FIGS. 5 and 7), and the other configuration to "hot melt" (FIGS. 4 and 6).

When examining the contents of unfiberized particles for these different configurations, one notices that each time numerous cones of the upper rows are completely enveloped by gas flow with temperatures in excess of the isothermic line corresponding to 100 poises (1,400° C.), a considerable number of beads is produced.

The drawings, especially FIGS. 2 through 7 thereof, are self-explanatory with respect to the constructional and functional details shown there. Therefore, special reference is made to the drawings as regards supplementary information about details of the arrangement of burner 13 and blower 24 and of the configuration of the cones and the temperature distribution in the surrounding gas. That FIGS. 2 through 7 show the position of the peripheral wall 19 of spinner 1' in "warm" state of the spinner, respectively of its position at ambient temperature as shown in phantom lines in FIGS. 2–7.

The use of the principles of the present invention is of particular advantage when in conjunction with the subject matter of the parallel international PCT patent application "Method for Producing Mineral Wool, and Mineral Wool Produced Thereby" filed for the same applicant company or assignee, respectively, on even date (now U.S. national phase application number 08/215,650), the full contents thereof being herewith incorporated herein by reference.

TABLE

| | TEST 1 | TEST 2 | TEST 3 | TEST 4 |
|---|---|---|---|---|
| Pull rate (kg/h) | 270 | 250 | 270 | 250 |
| Melt (stream)(°C.) | 1,510 | 1,480 | 1,510 | 1,480 |
| Spinner: | | | | D |
| Diameter (mm) | 200 | 200 | 200 | 200 |
| Alloy ODS | austenitic | austenitic | ferritic | austenitic |
| No. of orifices | 9,000 | 9,000 | 9,000 | 9,000 |
| Speed (rpm) | 2,820 | 3,500 | 2,820 | 3,500 |
| Orifice diameter (mm) | 0.3 | 0.3 | 0.3 | 0.3 |
| Cup: | | | | D |
| Diameter (mm) | 70 | 70 | 70 | 70 |
| No. of holes | 2 × 50 | 2 × 50 | 2 × 50 | 2 × 50 |
| External burner: | | | | C |
| Channel wall distance (mm) | 6.5 | 6.5 | 6.5 | 6.5 |
| Pressure (mm $H_2O$) | 345 | 350 | 355 | 355 |
| Temperature (°C.) | 1,550 | 1,550 | 1,550 | 1,550 |
| Blower: | | | | P |
| Channel wall distance (mm) | 0.8 | 0.8 | 0.8 | 0.8 |
| Pressure (bar) | 0.3 | 0.3 | 1.6 | 1.6 |
| Temperature (°C.) | 25 | 25 | 25 | 25 |
| Induction heater: | | | | P |
| Power (kW) | 37.5 | 37.5 | 39 | 39.8 |
| Diverging IB (Nm$^3$/h) | 3 | 3 | 3 | 3.05 |
| Figure | 4 | 5 | 6 | 7 |
| F/5 g | 3.5 | 3.2 | 2.9 | 2.8 |
| Beads >40 µm: % (wt.) | 24.5 | 8.8 | 10.5 | 7 |
| Beads >100 µm: % (wt.) | 7.25 | 3.4 | 3.5 | 2 |

We claim:

1. A method for producing mineral wool, comprising:

feeding a molten mineral material that is fluid at a liquidus temperature above 1,200° C. and has a viscosity of less than 5,000 poises at said liquidus temperature into a spinner having a spinner wall, said spinner wall comprising a peripheral wall having a plurality of orifices;

centrifuging the molten mineral material through said plurality of orifices thereby forming a plurality of filament cones emanating outwardly from said plurality of orifices, each of said filament cones having a length;

enveloping said spinner wall in a heated gas flow that flows along said peripheral wall;

heating said heated gas flow by an annular burner externally and concentrically disposed with respect to said spinner;

attenuating said plurality of filament cones by subjecting said plurality of filament cones to an attenuating effect of said heated gas flow to thereby form final fibers; and adjusting the lengths of said plurality of filament cones and a configuration of said heated gas flow so that a majority of said plurality of filament cones emanating outwardly from said plurality of orifices consecutively intersects a multiplicity of isotherms representing decreasing temperatures of said heated gas flow and increasing corresponding viscosities of the molten mineral material, wherein said majority intersects a 100 poise isotherm representing a 100 poise isotherm temperature of said heated gas flow and a corresponding viscosity of the molten mineral material of 100 poises so that a portion of said heated gas flow having temperatures less than said 100 poises isotherm temperature envelop said majority of said plurality of filament cones.

2. The method of claim 1, wherein said adjusting step is performed so that said majority of said plurality of filament cones intersects a 250–300 poises isotherm representing a 250–300 poises isotherm temperature of said heated gas flow and a corresponding viscosity of the molten mineral material of 250–300 poises so that a portion of said heated gas flow having temperatures less than said 250–300 poises isotherm temperature envelop said majority of said plurality of filament cones.

3. The method of claim 1, wherein the adjusting of the lengths of said plurality of filament cones comprises:
varying a diameter of said plurality of orifices through which the molten mineral material is centrifuged.

4. The method of claim 1, wherein the adjusting of the lengths of said plurality of filament cones comprises:
varying a rotational velocity of said spinner.

5. The method of claim 1, wherein the viscosity of the molten mineral material inside said orifices is in excess of 350 poises.

6. The method of claim 1, wherein the viscosity of the molten mineral material inside said orifices is in excess of 100 poises.

7. The method of claim 1, wherein the adjusting of the configuration of said heated gas flow comprises:
using a blower that emits an air flow with a temperature lower than 250° C.

8. The method of claim 7, wherein the adjusting of the configuration of said heated gas flow comprises:
selecting a plenum pressure of said blower in the range between 0.5 and 4 bar.

9. The method of claim 8, wherein said plenum pressure is in the range between 1 and 2 bar.

* * * * *

UNITED STATES PATENT AND TRADEMARK OFFICE
CERTIFICATE OF CORRECTION

PATENT NO.  : 5,601,628
DATED       : February 11, 1997
INVENTOR(S) : Battigelli et al It is certified that error appears in the above-indentified patent and that said Letters Patent is hereby corrected as shown below:

On the title page: Item [86], Date: please replace "Aug 20, 1994" with --Aug. 2, 1994 --.

Signed and Sealed this

Nineteenth Day of August, 1997

Attest:

BRUCE LEHMAN

Attesting Officer

Commissioner of Patents and Trademarks